United States Patent
Browne et al.

[11] 3,910,432
[45] Oct. 7, 1975

[54] APPARATUS FOR LIFTING AND LOADING A LOAD INTO AND OUT OF A VEHICLE OR THE LIKE

[75] Inventors: Kenneth A. Browne, Lexington; Ronald O. Browne, Staunton, both of Va.

[73] Assignee: Browne Engineering Corporation, Staunton, Va.

[22] Filed: Sept. 10, 1973

[21] Appl. No.: 395,602

[52] U.S. Cl. ............... 214/75 H; 212/9; 214/146.5; 214/148; 254/8 R; 254/124
[51] Int. Cl.² ............................................ B65D 9/00
[58] Field of Search... 214/77 R, 75 H, 75 G, 146.5, 214/148, 75 R, 75 T; 254/8 R, 124; 212/8 R, 9

[56] References Cited
UNITED STATES PATENTS

| | | | |
|---|---|---|---|
| 1,614,769 | 1/1927 | Amsler | 214/75 H |
| 1,867,844 | 7/1932 | Jungersen | 214/146.5 |
| 2,703,227 | 3/1955 | Hughes | 214/78 |
| 3,067,966 | 12/1962 | Hicks | 214/146.5 |
| 3,351,220 | 11/1967 | Kirkbride | 214/75 T |
| 3,584,755 | 6/1971 | Smith | 214/83.3 |
| 3,613,918 | 10/1971 | Kruschke | 212/8 R |

*Primary Examiner*—Robert J. Spar
*Assistant Examiner*—Gary Auton
*Attorney, Agent, or Firm*—Cushman, Darby & Cushman

[57] ABSTRACT

An apparatus for installation in a vehicle to provide means for lifting and lowering a load into and out of the vehicle by way of an opening formed through a side or end wall thereof is described. The apparatus provides for both vertical and horizontal vectors of movement so that the load can be traversed in a generally horizontal path over the floor or deck of the vehicle and lifted and lowered relative to such floor or deck from or to a lower level area outside of the vehicle. In addition, a path of movement is provided for moving the load up and down between its horizontal path and the floor itself so that the load can be delivered to and lifted from a final resting place in the vehicle. The apparatus includes a boom assembly which carries the load and which travels through paths of movement dictated by follower elements carried by the boom assembly and received by a guiding track means of an overhead support member carried within the vehicle.

9 Claims, 12 Drawing Figures

APPARATUS FOR LIFTING AND LOADING A LOAD INTO AND OUT OF A VEHICLE OR THE LIKE

BACKGROUND AND BRIEF DESCRIPTION OF INVENTION

This invention relates generally to improved apparatus for lifting and lowering a load through a prescribed path of travel which allows the load to be lifted or lowered relative to a ground area outside of a motor vehicle and moved into or out of the vehicle itself relative to the ground area. The arrangement is such that a relatively large load, such as a wheelchair carrying an occupant, can be safely lifted into and out of a vehicle in a way which provides full clearance of the load relative to the vehicle and its door opening through which the load is moved during all phases of movement of the load.

It is known in the art to provide various forms of lifting and lowering devices which can be controlled to lift loads vertically and horizontally for various purposes. Such prior art devices vary from relatively simple designs which provide for only a single vector of movement to those which offer alternative or combination vector movements for specific needs. However, as far as is known to applicant herein, no suitable prior art device has been designed for lifting and lowering a wheelchair and its occupant into and out of a vehicle in a completely safe and reliable manner without a use of a platform or costly and complex structures which require special care or assistance in operating in order to assure safe movements of the load. The present invention provides for a relatively simple and reliable apparatus which can be installed in an existing vehicle structure, or manufactured as a part of original equipment for such a vehicle, for lifting and lowering a wheelchair and its occupant into and out of a door opening of the vehicle. The invention is especially suited for wheelchair users who wish to move themselves into and out of a vehicle without any assistance, and who wish to move themselves into a position in a specially equipped vehicle to drive the vehicle once they have moved their wheelchair and themselves into the vehicle from a ground area next to the vehicle. Although the invention has particular application to a safe and reliable movement of a wheelchair and its occupant into and out of a vehicle, the principles of the invention can be applied to other load transferring requirements as well. For example, the apparatus which will be discussed in the more detailed description below can be installed in vehicles for use in lifting inanimate objects, such as large television consoles and other objects, into and out of service and delivery vehicles.

In accordance with the invention, a relatively simple boom assembly is provided for carrying a suspended load and for following a prescribed path of travel which lifts and lowers the load through a door opening provided in a side wall or end wall of a vehicle. The boom assembly is carried by a support member installed in an overhead position within the vehicle so as to extend from a position proximate to the opening formed through a wall of the vehicle to a position located over an interior floor area of the vehicle. A guide track means is carried by the support member for guiding back and forth movements of the boom assembly relative to the installed support member, and the boom assembly is provided with follower elements which engage portions of the guide track means to dictate a prescribed path of travel to the load carrying end of the boom assembly as it is moved along the length of the support member. The prescribed path of travel for the load carrying end of the boom assembly includes (a) a generally horizontal path of travel for traversing the load over a floor area of the vehicle while providing clearance over the floor area during such travel, (b) a first inclined path of travel which extends downwardly from an end of the horizontal path of travel nearest the opening through which the load is to be moved to a position outside of the vehicle which is lower than the horizontal path, so that a load can be received or deposited at an outside area and at a level lower than the floor level of the vehicle itself, and (c) a second inclined path of travel extending from an opposite end of the horizontal path of travel to a position which provides for a lowering and lifting of the load to and from the floor area of the vehicle. A driving means, which may be in the form of a continuous belt or chain driven by a single electric motor around a pair of spaced pulleys or sprockets, is provided for moving the boom assembly back and forth along the guide track means of the support member.

In a preferred form of the invention, the guide track means of the support member includes two guiding surfaces extending along the length of the guide track means to define the aforesaid paths of travel for the boom assembly. The guiding surfaces are vertically spaced in such a way that an upper guiding surface is engaged by one of the follower elements of the boom assembly while the lower guiding surface is engaged by the other of the follower elements of the boom assembly. Each of the guiding surfaces is shaped to guide its respective follower through certain components of movement of the aforesaid paths of travel, and the combined effect of the two guiding surfaces is to provide for a smooth range of travel of the boom assembly from its innermost retracted position within the confines of the vehicle to its outermost extended position where it delivers or receives a load to or from a ground area immediately adjacent to the vehicle.

These and other features and advantages of the present invention will become apparent in the more detailed discussion which follows. In that discussion reference will be made to the accompanying drawings as briefly described below.

DETAILED DESCRIPTION OF INVENTION

Figure 1:
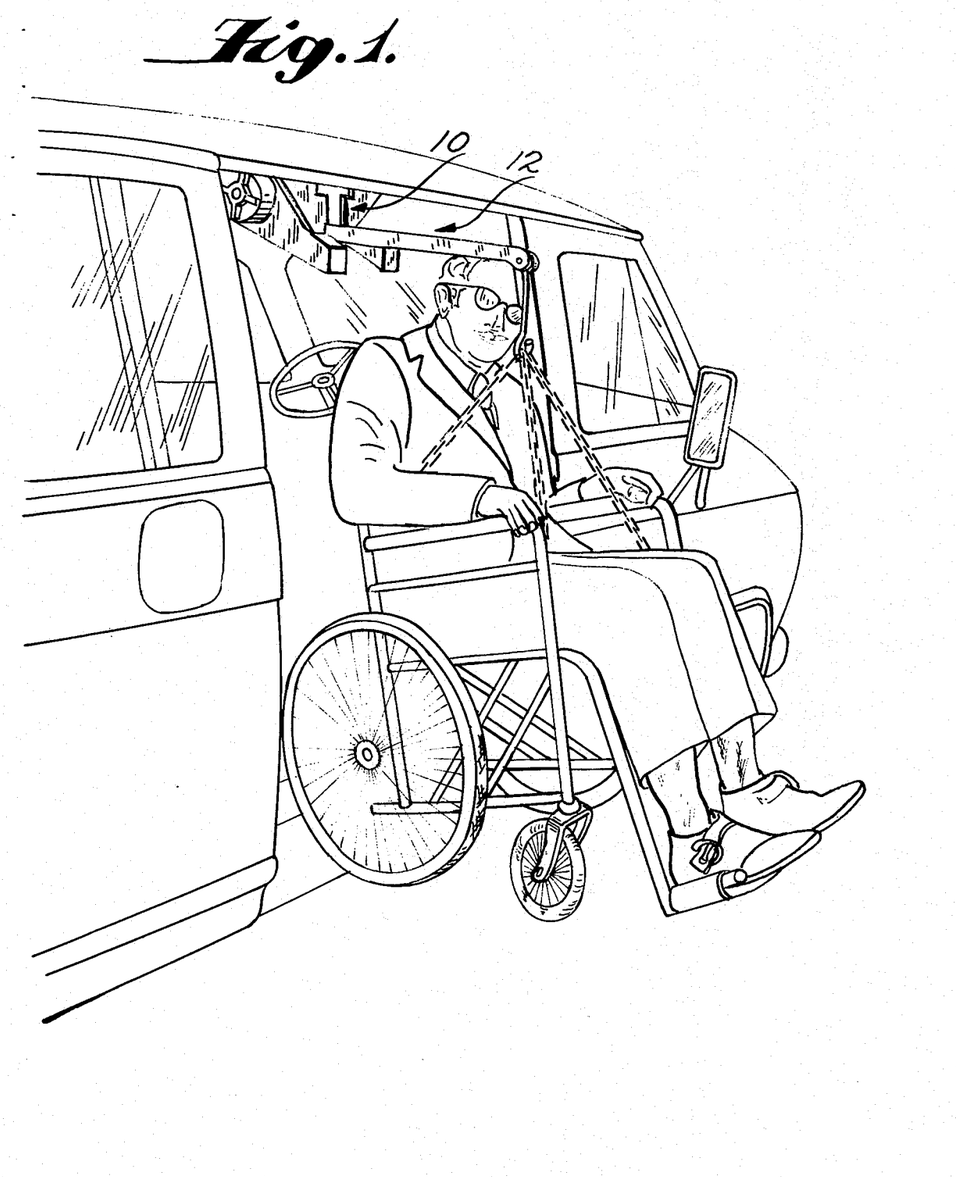
FIG. 1 is a perspective view of a portion of a vehicle showing an opening through a side wall thereof and illustrating the position of a wheelchair and its occupant as the load is being moved, by the apparatus of this invention, over the floor sill of the vehicle during a loading or unloading operation.
Figure 2:
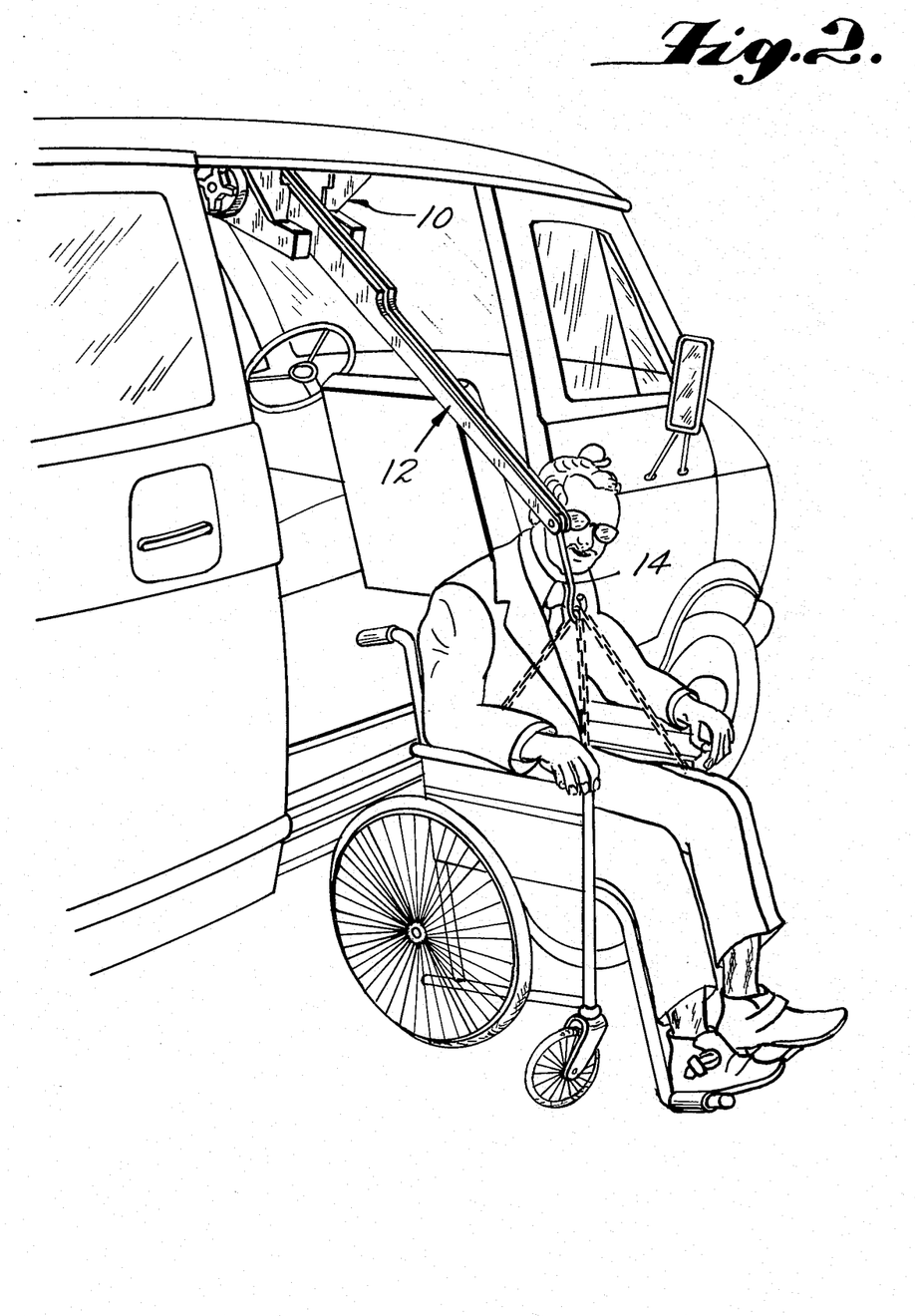
FIG. 2 is a view similar to FIG. 1, showing the apparatus in a fully extended position for receiving or depositing the load on a ground area adjacent to the vehicle.

Referring to FIGS. 1 and 2, the apparatus of the present invention is illustrated as installed in a motor vehicle for a use in lifting and lowering a wheelchair and its occupant through a side opening in the motor vehicle. Although the apparatus is especially useful for this purpose, it can be appreciated that it may be installed in other positions in motor vehicles, or in other loading zone applications, for lifting and lowering loads between a lower level and an upper level which is horizontally offset from the lower level position of the load. For example, the illustrated apparatus may be installed so as to extend through a back end opening in a motor vehicle and may be used for lifting and lowering relatively heavy objects into and out of the vehicle so as to clear its rear bumper area during loading and unloading operations.

In FIGS. 1 and 2, the portions of the apparatus which can be seen include an overhead support member 10 which is installed in an overhead position across the interior roof area of the vehicle so as to carry all load forces during loading and unloading operations. In addition, an end portion of a boom assembly 12 can be seen. In the FIG. 1 view, the boom assembly 12 is partially extended outwardly through the side opening of the vehicle, and in this position a load suspended from a free end thereof is held in a position which provides for a clearance of the load over the floor and sill of the vehicle as the load is moved between such areas and a ground area at a lower level outside of the vehicle. FIG. 2 shows the boom assembly in a fully extended position for receiving or depositing a load at the lower level area adjacent the floor or deck to or from which it is to be moved. Thus, the operation of the apparatus involves a sequence of movements which move a load through a path of travel that includes both vertical and horizontal vectors of movement. As will be discussed in greater detail below, specific structures are provided for guiding and controlling the movement of a load so that a prescribed path of travel is followed during loading and unloading operations.

The load may be suspended from a free end of the boom assembly 12 in any known manner. The illustrated embodiment of FIGS. 1 and 2 provides for a suspension hook 14 which is mounted for limited universal movement at the end of the boom assembly 12 so that the suspension hook 14 will maintain a vertical orientation during changes in relative position of the boom assembly. The illustrated wheelchair is suspended from the hook 14 with four chains or connecting lines which balance the load of the chair and its occupant relative to a suspension point at the end of the suspension hook 14.

Figures 3, 4, 5:
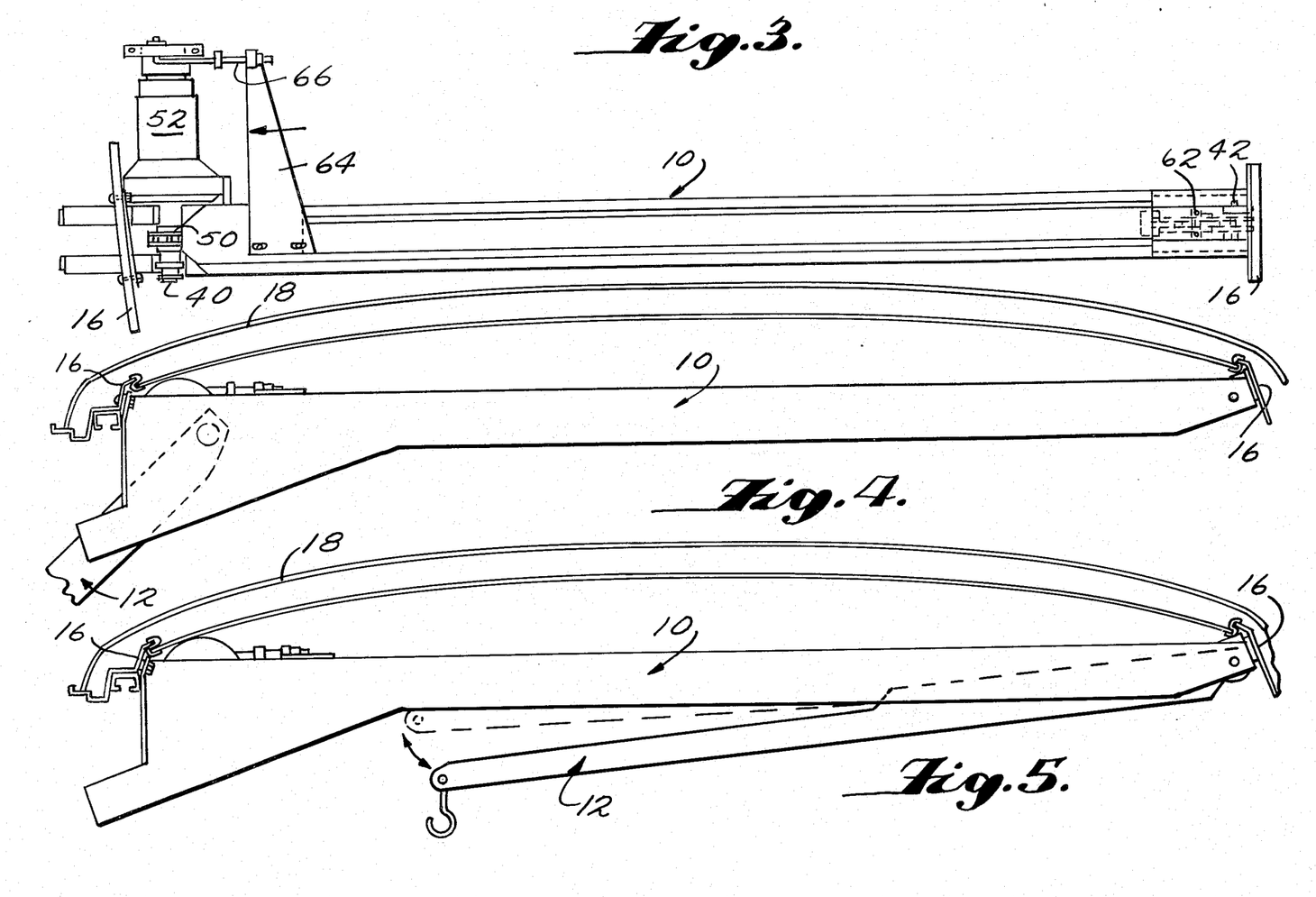
FIG. 3 is a top plan view of a support member and its associated structures as installed across the width of a vehicle of the type shown in FIGS. 1 and 2.
FIG. 4 is a side elevational view, partly in section, of the support frame member of FIG. 3, and showing a portion of a boom assembly in a fully extended position relative to the support member.
FIG. 5 is a view similar to FIG. 4, and drawn in the same scale as FIGS. 3 and 4, showing a boom assembly in a fully retracted position relative to a support member.

FIGS. 3–5 illustrate overall relationships for the support member 10 and its associated boom assembly 12, as they appear in an installation which extends across the width of a vehicle of the type shown in FIGS. 1 and 2. In FIG. 3 certain sidewall structures of the vehicle are represented by the reference numeral 16, and in FIGS. 4 and 5 certain roof structures of the vehicle are indicated generally at 18. As illustrated, the support member 10 comprises a generally elongate structure which is formed from metal in a configuration of sufficient strength and rigidity to support a load being moved back and forth across its length. The support member 10 is secured to the roof structures 18 of the vehicle by known means to provide for a secure mounting of the support member 10 in an overhead position which extends from a position proximate to an opening formed through a wall of the vehicle (towards the left in the FIGS. 3–5 views) to a position located over an interior floor area where the load is to be received within the vehicle itself. In the illustrated embodiment, the support member actually extends beyond the final position to which a load is to be received within the vehicle so as to accommodate storage of the boom assembly 12 in its fully retracted position and to take advantage of framing structures on an opposite wall of the vehicle for securing the support member 10 thereto. FIG. 4 illustrates a working end portion of the boom assembly 12 in its position for fully extending the boom assembly outwardly through the side opening of the vehicle and downwardly towards the ground area to which a load is to be deposited or received. FIG. 5 illustrates a fully retracted position of the boom assembly 12 after it has moved to a limit position which dictates a movement for lifting and lowering the load relative to the floor area of the vehicle. The phantom line illustration of the boom assembly 12 in FIG. 5 shows the relative position of the boom assembly during traversing movements of the boom assembly between its limit positions relative to the support member 10, and it can be seen that the traversing position is at a higher level than either of its limit positions so as to provide a clearance of the load over the floor or deck of the vehicle during such traversing movements.

Referring now to FIGS. 6–10, working details of a specific embodiment of the invention will be discussed.

Figures 6, 7, 8, 9, 10:
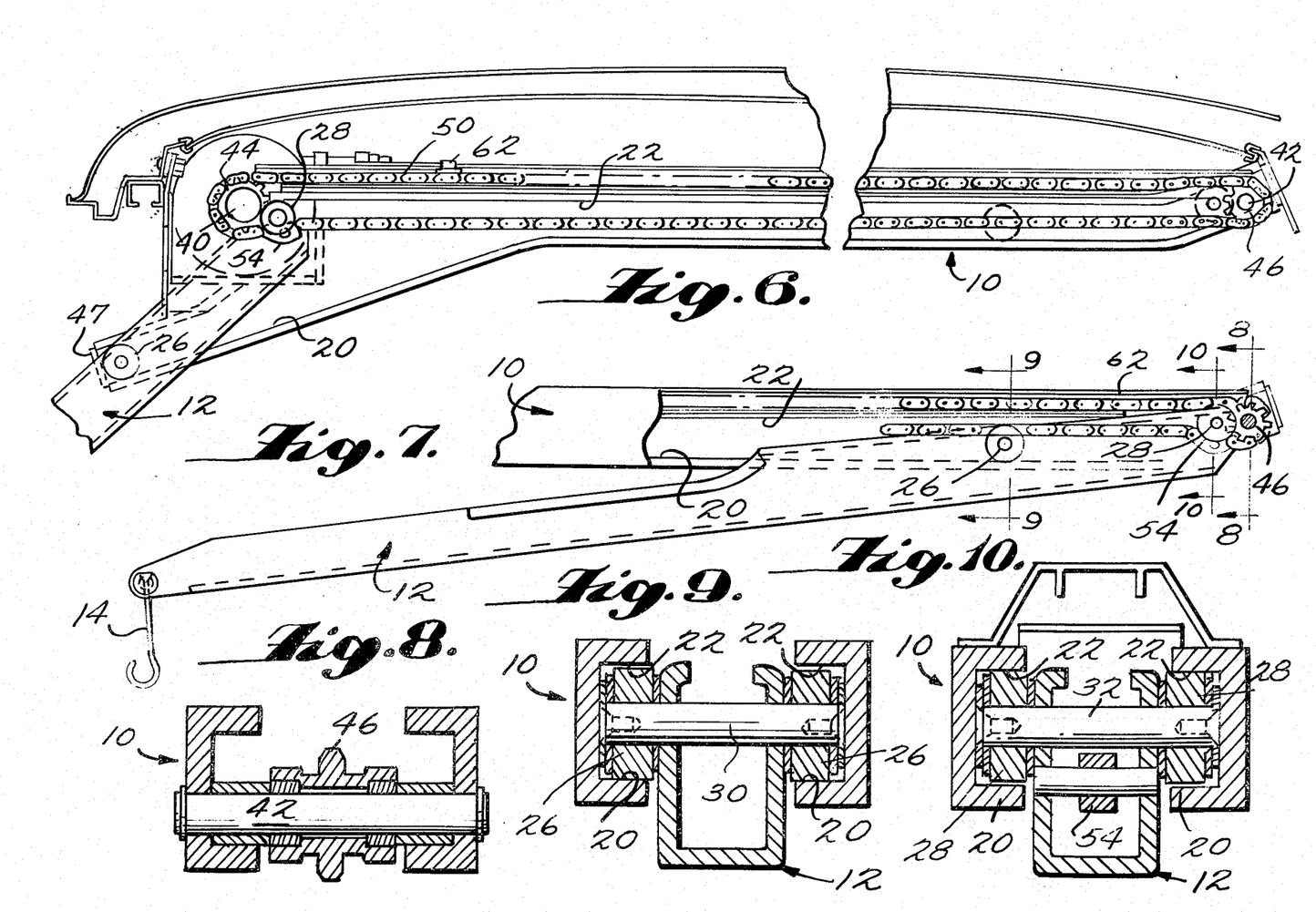
FIG. 6 is an enlarged view similar to what is shown in FIG. 4, but showing internal details of structure of the support member and its associated boom assembly.
FIG. 7 is a view similar to FIG. 6, and drawn in the same scale, showing a retracted boom assembly relative to a portion of a support member.
FIG. 8 is a cross sectional view, in greatly enlarged scale, of a sprocket mounted at one end of the support member, as seen generally on line 8—8 of FIG. 7.
FIG. 9 is a view in the same scale as FIG. 8, showing the relationship of a first set of follower elements carried at the position indicated generally by line 9—9 of FIG. 7.
FIG. 10 is a view in the same scale as FIGS. 8 and 9 showing a second set of follower elements carried generally at the position indicated at 10—10 of FIG. 7.

In addition to supporting the load as it is being moved, the overhead support member 10 further functions to guide the load through a prescribed path of travel as it is moved from one position to another. This latter function is accomplished with guide track means carried by the support member 10 for guiding back and forth movements of the boom assembly 12 relative to the support member. In the illustrated embodiment, the guide track means include lower guiding surfaces 20 and upper guiding surfaces 22. As shown in FIGS. 9 and 10, the guiding surfaces 20 and 22 are formed by flanges projecting laterally from upright wall portions of the framing components making up the support member 10. A pair of such framing components are arranged parallel to each other with a space therebetween so as to receive the boom assembly 12, and opposing flanges of the pair of framing components define the separate guiding surfaces 20 and 22, as illustrated. Of course, guiding sufaces may be formed in other known ways, and may include grooves formed into a support member or similar structure, but the illustrated embodiment represents a structure which is easily formed from stock material to provide the requisite guiding functions for the apparatus of this invention.

The guide track means of the support member 10 are arranged to provide a path of travel for a load carrying end of the boom assembly 12 which includes (a) a generally horizontal path of travel for traversing a load over a floor area of a vehicle, (b) a first inclined path of travel which extends from an end of the horizontal path of travel nearest the opening through which the load is to be moved to a position outside of the vehicle which is lower than the horizontal path so that a load can be received or deposited at an outside area and at a level lower than the floor level of the vehicle, and (c) a second inclined path of travel extending from an opposite end of the horizontal path of travel to a position which provides for a lowering and lifting of a load to and from the floor area of the vehicle while it is inside of the vehicle. The aforesaid paths of travel are determined by engagement of spaced follower elements 26 and 28 (carried by an end of the boom assembly 12 which is opposite to its load carrying end) with the guide track means of the support member 10. In the context of this specification, the follower elements 26 and 28 will be referred to as a "pair" of spaced follower elements. This is meant to describe a pair of follower elements made up of a forward follower and a rearward follower spaced therefrom along the length of a boom assembly, although an actual construction may provide for dual forward elements and dual rearward follower elements, as in the illustrated embodiment of FIGS. 9 and 10. The follower elements may comprise any known and suitable structures which can engage and follow a guide track surface so as to dictate changes in position to the boom assembly 12. In the illustrated embodiment, the follower elements 26 and 28 comprise sets of rollers fitted on axles 30 and 32, respectively, which are mounted to extend through the main body of the boom assembly 12 so as to place a roller on each side of the boom assembly for being received into corresponding flange areas of the support member 10. The forward set of follower elements 26 ride on and follow the lower guiding surfaces 20 of the support member 10, and the rearward set of follower elements 28 bear against and follow the upper guiding surfaces 22 of the support member 10.

For clarity of illustration, the views of FIGS. 6 and 7 show only a single side of the support member 10 and the relationship of the follower elements 26 and 28 to guiding surfaces 20 and 22 formed thereon. In an actual construction, the follower elements 26 and 28 included dual sets of rollers, of the type illustrated in FIGS. 9 and 10, for engaging the opposed guiding surfaces.

All of the load forces on the boom assembly 12 are transmitted back to the pair of follower elements 26 and 28. The forward follower elements 26 are pulled downwardly into engagement with the lower guiding surface 20 while the rearward follower elements are pushed upwardly into engagement with the upper guiding surface 22. In this sense, the forward follower elements 26 act somewhat as a fulcrum between the loaded and unloaded ends of the boom assembly. It can be seen that as the boom assembly moves from its fully extended position of FIG. 6 to its fully retracted limit position of FIG. 7, the forward follower elements 26 follow, first, an inclined portion of the lower guiding surface 20, followed by a nearly horizontal portion of the guiding surface 20. The inclined portion of the guiding surface 20 provides for a compound movement which allows movement of a load in a generally vertical direction so that, during retraction, the load is lifted vertically to a point where it will clear the sill and floor of a vehicle before it is drawn into the vehicle. The horizontal portion of the lower guiding surface 20 provides for a traversing movement of the load across the floor of the vehicle while maintaining a clearance between the load and the vehicle floor. As the forward follower elements 26 are following the inclined and horizontal portions of the lower guiding surface 20, the rearward follower elements bear against the upper guiding surface 22. A major portion of the upper guiding surface 22 is generally horizontal and this provides for a tilting of the boom assembly as it is retracted from the FIG. 6 position, followed by a maintaining of position of the boom assembly during traversing movements across the floor of the vehicle. However, the upper guiding surface 22 is provided with an upwardly inclined portion at its rearward end away from the opening of the vehicle. The upward inclined portion provides for a final dropping of the load bearing end of the boom assembly during a retracting movement to place the load on the floor of the vehicle when the boom assembly has reached its full retracted limit position. FIG. 7 illustrates the position of the boom assembly when the rearward follower elements 28 have moved upwardly slightly so as to allow the load bearing end of the boom assembly to drop about the fulcrum point defined by the forward follower elements 26. Extension movements of the boom assembly from the retracted position shown in FIG. 7 to the fully extended position shown in FIG. 6 follow the reverse order of movements just described, as will be appreciated.

Comparing FIGS. 6 and 7, it can be seen that the rearward follower elements 28 bear against axle members 40 and 42 of drive sprockets 44 and 46, respectively, when the boom assembly is in either of its limit positions, and the forward follower elements 26 bear against an end plate 47 of the support member when the boom assembly is in a fully extended position. This arrangement assures a safe positioning of the boom assembly for each of its limit positions during unloading or loading operations.

Driving means are provided for moving the boom assembly back and forth along the guide track means which have been discussed above. The driving means includes a continuous chain means 50 (or its equivalent, such as a continuous belt) extending around a pair of spaced apart sprocket means 44 and 46 (or pulley means in the case of a continuous belt). The sprocket means 44 and 46 are mounted in fixed positions relative to each other on axle members 40 (which may comprise the output shaft of a drive motor) and 42, respectively, carried by the framing components which make up the support member 10. In the illustrated embodiment, the axle means 40 and its associated sprocket 44 are driven from an output of a reversible drive motor means 52 (shown in FIGS. 3, 11 and 12). a connecting link 54 secures the continuous chain means 50 to the boom assembly 12 so that driving movements applied to the continuous chain means will be imparted to the boom assembly itself. FIG. 10 illustrates the connection between the boom assembly 12 and the connecting link of the continuous drive chain means. The connecting link 54 is of such a configuration that when the boom assembly 12 is in either of its limit positions of FIGS. 6 or 7, the connecting link serves to remove all slack from the continuous chain means as the follower elements 28 engage either of the sprocket wheel axles 40 or 42. A portion of the connecting link is drawn up against the axle 32 of the follower elements 28 during final movements to limit positions, and this applies a tension to the continuous chain means 50 to thereby establish a tight relationship between all working components in the limit positions.

Figure 11:
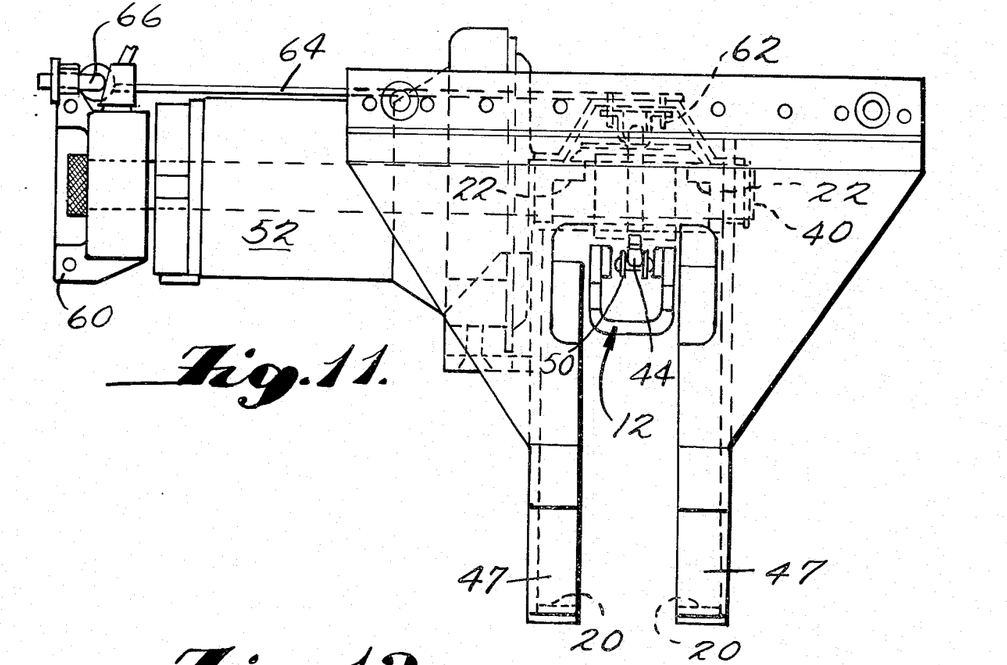
FIG. 11 is a greatly enlarged end view of the apparatus as it would be seen looking towards an opening through which a load is to be moved by the apparatus.
Figure 12:
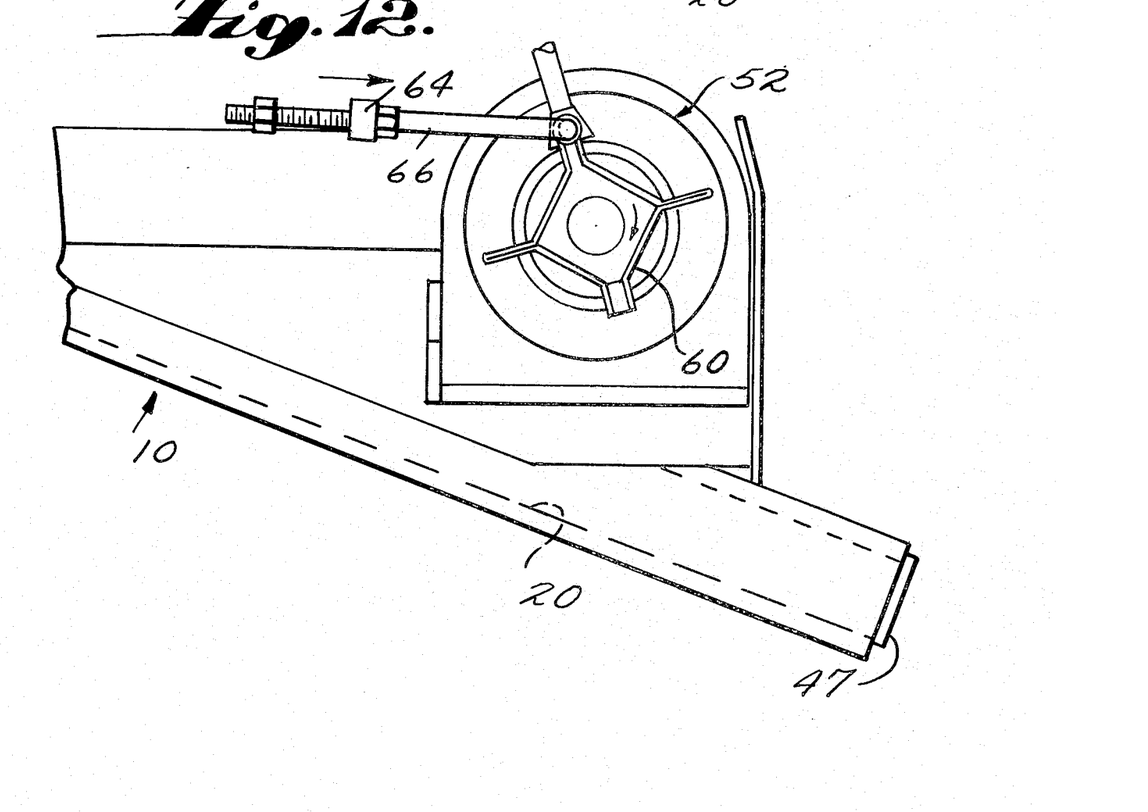
FIG. 12 is a side view of a portion of the apparatus shown in FIG. 11, shown in the same scale.

The electric motor means 52 may be of any known type which can be mounted so that its output shaft is coextensive with or coupled to the axle of the drive sprocket wheel 44. The mounted arrangement of the drive motor means 52 is shown in FIGS. 11 and 12. The drive motor means 52 can be combined with known differential planetary gear reduction units, and the motor can be operated directly from the 12 volt system of a vehicle. Preferably, the electric motor means 52 is reversible and self-locking, and its controls can be manually or remotely controlled. Manual controls include two pull cords for forward and reverse operations, and remote control may be in the form of a control panel containing pushbutton controls.

An automatic stop limit switch is provided for stopping the electric motor means 52 when it has driven the drive chain means 50 to its limit position for fully retracting the boom assembly 12. Referring to FIGS. 3, 11 and 12, the stop switch of the electric motor means 52 comprises a manual switch member 60 which stops the electric motor when rotated in a clockwise direction from the position shown in FIG. 12. Clockwise movement of the switch is automatically effected by a master link 62 (see FIG. 3) as the top flight of the continuous chain 50 advances towards the door opening so as to retract the boom assembly 12. With this movement, the master link 62 moves from the position shown in FIG. 3 to a position where it contacts a slide plate 64 slideably mounted on a top housing portion of the support member 10. The master link 62 slides beneath the slide plate 64 and is provided with dog legs or other structures for contacting a portion of the slide plate 64 so as to effect a limited sliding movement of the slide plate 64 in the direction of the arrow in FIG. 3. This results in a movement of a connecting link arm 66 in the same direction to effect rotation of the motor switch 60. Referring to FIG. 12 the effect of movement of the connecting arm 66 in the direction of the arrow can be appreciated. A free end of the connecting arm 66 is threaded to provide for a mounting and adjustment of the sliding plate 64 relative thereto to adjust the contact point at which the switch member 60 is rotated to an off position.

In an actual construction of the apparatus discussed above, all working components were formed from metal stock material so as to produce a device having a 500 lb. lifting capacity. The forward and rearward sets of follower elements 26 and 28 were spaced approximately 8 inches apart, and the guiding surfaces 20 and 22 were arranged to provide for a lowering of the load carrying end of the boom assembly for a distance of approximately 27 inches for loading and unloading the boom assembly outside of the vehicle in which the apparatus was installed. The upper guiding surface 22 was turned upwardly for a short radius which caused the load carrying end of the boom assembly to lower approximately 4 inches during final retraction movements of the boom assembly within the vehicle. Shielding devices can be provided along the sides of the boom assembly 12 at points where the boom assembly is received upwardly into the support member 10. Such shield devices are in the form of sheet metal or other sheet material shields which effectively close off the scissors point between the boom assembly and the support member during movement of the boom assembly upwardly into the support member. In addition, an automatic door closing device may be installed in the vehicle and provided with controls to prevent closing of the door when the boom assembly is in an extended position. Likewise, additional controls can be provided to prevent operation of the boom assembly when the door is fully closed. The suspension hook 14 can be provided with a hemispherical head portion for being received into a similarly shaped recess formed in a trunnion bearing to which the suspension hook is fitted at the end of the boom assembly 12. This arrangement permits swinging movements of the suspension hook 14 for limited lateral movements as well as full pivotal movements of 360° of its trunnion bearing. The suspension hook can be swung 90° and pushed through its trunnion bearing in such a way that it can be stored within the end of the boom assembly when desired.

In operation, the above described apparatus provides for full control of all movement by an occupant of a wheelchair. The individual can position his wheelchair parallel to the door of a vehicle, unlock the door and turn its lever to release its safety latch. Then, the door can be opened manually by the individual or automatically by an automatic door closing device which may be provided on the vehicle. Next, he can turn the wheelchair in a position to back up against the vehicle so as to be approximately centered in its doorway opening. By actuating a control cable or pushbutton control, he can then extend the boom assembly straight out over his seated position and downwardly to a position where the suspension hook 14 is located approximately 6 to 8 inches above the seat of the wheelchair. During such movement, the individual would tip his head slightly so that the boom assembly would move downwardly over one of his shoulders to a centerline position of the wheelchair. Preset slings are then attached to the suspension hook, and the chair and occupant are ready for lifting upon actuation of the appropriate control cord or pushbutton. The boom assembly then lifts the wheelchair and its occupant through an arc clearing the sill and floor area of the vehicle and moves the load over the floor area of the vehicle to a point where it is lowered to contact the floor at the end of its retraction movement. Before disconnecting the wheelchair from the suspension hook, the occupant would close the door of the vehicle. With the door closed, the wheelchair can be safely disconnected from the suspension hook, and a control cable can be operated for a short time to extend the boom assembly sufficiently to raise it up into the support member to provide maximum head room within the vehicle. The free end of the suspension hook can then be swivelled about and pushed into the open end of the boom assembly for storage. After this, the wheelchair occupant can move the chair into a driver's position within the vehicle and lock it in place in readiness to use the vehicle.

Although the invention has been described above with reference to a specific embodiment which is especially useful for lifting and lowering wheelchairs and their occupants, it can be appreciated that there are many other applications for a device of this type. For example, relatively heavy items such as refrigerators, televisions, ranges and other similar loads can be easily lifted and handled while carried by a dolly with only a single operator with the device of this invention. In addition, it will be recognized by persons skilled in this art that various types of control systems can be combined with the apparatus of this invention to effect full control of all movements of the boom assembly relative to the vehicle and its overhead support member. The overhead support member and boom assembly may be changed in their configurations to fit specific installation needs, and fully equivalent structures and relationships can be substituted for those discussed above. All such modifications and substitutions as would be considered to be fully equivalent to the specific embodiment discussed herein are intended to be included within the scope of protection defined by the claims below.

What is claimed is:

1. An apparatus which can be installed or included in a motor vehicle so as to provide for means for lifting and lowering a load into and out of the vehicle through an opening through a side or end wall thereof, said apparatus comprising:
    a support member which can be installed in an overhead position within the vehicle so as to extend from a position proximate to an opening formed through a wall of the vehicle to a position located over an interior floor area of the vehicle,
    an elongated boom assembly carried by said support member so as to be movable back and forth along the length of said support member, said boom assembly having means for suspending a load from one end thereof, said load carrying end being spaced from said support member,
    guide track means carried by said support member for guiding back and forth movements of said boom assembly relative to said support member and for defining a path of travel for a load carrying end of said boom assembly which includes (a) a generally horizontal path of travel for traversing a load over a floor area of said vehicle, (b) a first inclined path of travel which extends from an end of said horizontal path of travel nearest the opening through which the load is to be moved to a position outside of the vehicle which is lower than said horizontal path, so that a load can be received or deposited at an outside area and at a level lower than the floor level of the vehicle and (c) a second inclined path of travel extending from an opposite end of said horizontal path of travel to a position which provides for a lowering and lifting of a load to and from the floor area of the vehicle relative to said horizontal path,
    said guide track means including a generally upwardly facing guiding surface and a generally downwardly facing guiding surface, said downwardly facing guiding surface being vertically spaced from and above said upwardly facing guiding surface and said guiding surface extending along the length of the guide track means to define said paths of travel, including said upwardly facing guiding surface defining a path of travel which includes said generally horizontal path and said first inclined path and said downwardly facing guiding surface defining a path of travel which includes said generally horizontal path and said second inclined path, for said boom assembly,
    first and second follower elements carried by said boom assembly and spaced along the length of said boom assembly, said first follower element being closer to said load carrying end of said boom assembly than said second follower element,
    said first follower element being biased into engagement with said generally upwardly facing guiding surface and said second follower element being biased into engagement with said generally downwardly facing guiding surface and said follower elements lying in generally the same horizontal plane when being guided in said generally horizontal path of travel, and
    driving means for moving said boom assembly back and forth along said guide track means.

2. The apparatus of claim 1 wherein said pair of follower elements comprise roller elements carried in spaced positions on said boom assembly.

3. The apparatus of claim 1 wherein said driving means includes a continuous belt means or the like extending around a pair of spaced apart pulley means or the like carried by said overhead support member, with one of said pulley or sprocket means being driven by a reversible drive motor means, and including connecting means for connecting a portion of said continuous belt means or the like to said boom assembly so that the boom assembly is moved when driving moments are applied to the continuous belt means or the like.

4. The apparatus of claim 3 and including stop control means carried by said continuous blet means or the like for automatically stopping said drive motor means when a limit position of movement for the boom assembly has been reached.

5. The apparatus of claim 3 wherein said first and second follower elements of said boom assembly each comprise a pair of spaced follower members which are adapted to engage said guide track means for guiding the boom assembly through said paths of travel, and wherein each of said pairs of spaced follower members is arranged to contact a limit structure at respective ends of said support member at limit positions of travel of said boom assembly.

6. The apparatus of claim 5 wherein said limit structures comprise axle means of said pulley means or the like.

7. An apparatus for lifting and lowering a load through a path of travel which includes both vertical and horizontal vectors of movement, comprising:
    an overhead support member positioned above the path of travel of the load to be moved by the apparatus, an elongated boom assembly carried by said overhead support member so as to be movable relative to the overhead support member, said boom assembly having means for suspending a load therefrom at one end thereof, said load carrying end being spaced from said support member, track engaging elements carried by said boom assembly comprising first and second followers spaced along the length of said boom assembly, said first follower being located closer to said load carrying end of said boom assembly than said second follower, guiding track means connected to said overhead support member for guiding the movement of said boom assembly relative to the overhead support member and for defining a path of travel for said track engaging elements carried by said boom assembly, said track means being arranged to define (a) a generally horizontal path of travel for a load carried by said boom assembly, said followers lying in generally the same horizontal plane when guided in said generally horizontal path of travel, (b) a first inclined path of travel for lifting and lowering the load relative its horizontal path of travel, and (c) a second inclined path of travel for lifting and lowering the load at the other end, and said track means comprising a generally upwardly facing guiding surface and a generally downwardly facing guiding surface, said downwardly facing guiding surface being vertically spaced from and above said upwardly facing guiding surface, and said upwardly facing guiding surface defining a path of travel which includes said generally horizontal path and said first inclined path and said downwardly facing guiding surface defining a path of travel which includes said generally horizontal path and said second inclined path, said first follower being biased into engagement with said generally upwardly facing guiding surface and said second follower being biased into engagement with said generally downwardly facing guiding surface, and driving means for moving said boom assembly back and forth along said track means for lifting, lowering and traversing a load through said paths of travel.

8. The apparatus of claim 1 wherein both of said follower elements are located at a point opposite the center of gravity of said boom assembly from said load carrying end of said boom assembly.

9. The apparatus of claim 7 wherein both of said followers are located at a point opposite the center of gravity of said boom assembly from said load carrying end of said boom assembly.

* * * * *